(12) United States Patent  (10) Patent No.: US 9,207,811 B2
Hou et al.  (45) Date of Patent: Dec. 8, 2015

(54) OPTICAL IMAGING SYSTEM CAPABLE OF DETECTING A MOVING DIRECTION OF AN OBJECT AND IMAGING PROCESSING METHOD FOR OPTICAL IMAGING SYSTEM

(71) Applicant: Wistron Corporation, New Taipei (TW)

(72) Inventors: Chia-Chang Hou, New Taipei (TW); Po-Liang Huang, New Taipei (TW); Kuo-Hsien Lu, New Taipei (TW)

(73) Assignee: Wistron Corporation, New Taipei (TW)

( * ) Notice: Subject to any disclaimer, the term of this patent is extended or adjusted under 35 U.S.C. 154(b) by 18 days.

(21) Appl. No.: 14/451,442

(22) Filed: Aug. 5, 2014

(65) Prior Publication Data
US 2015/0234539 A1  Aug. 20, 2015

(30) Foreign Application Priority Data
Feb. 18, 2014 (TW) .............................. 103105356 A

(51) Int. Cl.
*G06F 3/042* (2006.01)

(52) U.S. Cl.
CPC ..................................... *G06F 3/0421* (2013.01)

(58) Field of Classification Search
CPC .............................. G06F 3/0421; G06F 3/0433
See application file for complete search history.

(56) References Cited

U.S. PATENT DOCUMENTS

| | | | | |
|---|---|---|---|---|
| 8,488,413 B2* | 7/2013 | Nishino | ................ | G06F 3/0433 367/127 |
| 9,063,616 B2* | 6/2015 | Yu | .......................... | G06F 3/0421 |
| 2002/0047833 A1* | 4/2002 | Kitada | .................. | G06F 3/0433 345/173 |
| 2007/0070358 A1* | 3/2007 | Ouchi | ................... | G01S 17/875 356/614 |
| 2010/0045634 A1* | 2/2010 | Su | ......................... | G06F 3/0421 345/175 |

* cited by examiner

*Primary Examiner* — Shaheda Abdin
(74) *Attorney, Agent, or Firm* — Winston Hsu; Scott Margo

(57) ABSTRACT

An optical imaging system includes a display panel, a light source module, a touch object, a first image capturing module, a second image capturing module and a control module. The touch object moves from a first position at a first time to a second position at a second time. The first image capturing module and the second image capturing module respectively capture light reflected from the touch object, so as to generate a first signal, a second signal, a third signal and a fourth signal corresponding to the touch object at the first time and the second time. The control module computes a moving direction of the touch object according to variation of the first signal, the second signal, the third signal and the fourth signal.

18 Claims, 16 Drawing Sheets

OPTICAL IMAGING SYSTEM CAPABLE OF DETECTING A MOVING DIRECTION OF AN OBJECT AND IMAGING PROCESSING METHOD FOR OPTICAL IMAGING SYSTEM

BACKGROUND OF THE INVENTION

1. Field of the Invention

The present invention is to provide an optical imaging system and an imaging processing method, and more specifically, to an optical imaging system capable of detecting a moving direction of an object and an imaging processing method for the optical imaging system.

2. Description of the Prior Art

In the modern consumer electronic products, a portable electronic product such as a personal digital assistant, a smart phone or a mobile phone is equipped with a touch control device as an interface for data transmission. Since consumer electronic products have become lighter, thinner, shorter and smaller, there is no space on these products for containing a conventional input device, such as a mouse, a keyboard and so on. Furthermore, with development of tablet computers focusing on humanity design, a display with the touch control device has gradually become one of the key components in various electronic products. A variety of touch control technologies, such as a resistive type, a capacitive type, an ultrasonic type, an infrared type, an optical imaging type and so on have been developing. Due to consideration for technology level and cost, the above-mentioned touch control technologies have been implemented in various fields.

For example, principle of the optical imaging design is to utilize two image capturing modules located at two corners of the display for detecting a position of an object on the display. Then, the position of the object on the display is calculated by triangulating location. Thus, compared with the conventional resistive type or capacitive type touch device, it has advantages of accuracy, high penetration, good stability, low damage rate, low cost and being capable of multi-touch, and the optical imaging design is overwhelmingly advantageous in the large-size display market. However the conventional optical imaging touch device needs a reflecting frame as a photographic background when the object is located within a coordinate detecting area, to isolate interference outside the coordinate detecting area. The object blocks the light reflected from the reflecting frame as locating within the coordinate detecting area so as to detect a shadow by a sensor, for getting the position of the object by the position of the shadow. In other words, the reflecting frame provides the function of blocking the interference and difference between the object and the background. However, the reflecting frame and the sensor have to be installed on the same plane, resulting in difficulty in assembly and increasing manufacturing cost. However, the reflecting frame and the sensor have to be installed on the same plane, resulting in difficulty in assembly and increasing manufacturing cost. Furthermore, the accuracy of touch control is often unsatisfactory as utilizing a conventional optical imaging system. Therefore, it is an important issue to design an optical imaging system with high accuracy of touch control and low cost.

SUMMARY OF THE INVENTION

The present invention is to provide an optical imaging system capable of detecting a moving direction of an object and an imaging processing method for the optical imaging system to solve the above drawbacks.

According to the disclosure, an optical imaging system capable of detecting a moving direction of an object includes a display panel, a light source module, a touch object, a first image sensor, a second image sensor and a control module. A coordinate detecting area is formed on the display panel. The light source module is disposed on an outer side of the display panel and for emitting light. The touch object includes at least one reflective section for reflecting the light emitted from the light source module as moving in the coordinate detecting area, and the touch objects moves from a first position at a first time to a second position at a second time. The first image sensor is disposed on an outer corner of the display panel and for capturing light reflected from the at least one reflective section so as to respectively generate a first signal at the first time and a second signal at the second time corresponding to the touch object. The second image sensor is disposed on another outer corner of the display module and for capturing light reflected from the at least one reflective section so as to respectively generate a third signal at the first time and a fourth signal at the second time corresponding to the touch object. The control module is coupled to the first image sensor and the second image sensor, and the control module is for computing a moving direction of the touch object from the first position to the second position according to variation of the first signal, the second signal, the third signal and the fourth signal.

According to the disclosure, a plurality of transparent bead structures or a plurality of prism structures is formed on the touch object.

According to the disclosure, the control module determines the touch object to move from the first position to the second position in a first vertical direction, as a waveform of the first signal shifts in a first direction to form the second signal and a waveform of the third signal shifts in the first direction to form the fourth signal.

According to the disclosure, the control module further determines the touch object to move from the first position to the second position at a second vertical direction opposite to the first vertical direction, as the waveform of the first signal shifts in a direction opposite to the first direction to form the second signal and the waveform of the third signal shifts in the direction opposite to the first direction to form the fourth signal.

According to the disclosure, the control module determines the touch object to move from the first position to the second position in a first horizontal direction, as a waveform of the first signal slightly shifts in a first direction to form the second signal and a waveform of the third signal shifts in a direction opposite to the first direction to form the fourth signal.

According to the disclosure, the control module further determines the touch object to move from the first position to the second position in a second horizontal direction opposite to the first horizontal direction, as the waveform of the first signal shifts in the direction opposite to the first direction to form the second signal and the waveform of the third signal slightly shifts in the first direction to form the fourth signal.

According to the disclosure, the control module determines the touch object to rotate from the first position to the second position in a first rotating direction, as an amplitude of the first signal is amplified to form the second signal and an amplitude of the third signal is reduced to form the fourth signal.

According to the disclosure, the control module further determines the touch object to rotate from the first position to the second position in a second rotating direction opposite to the first rotating direction, as the amplitude of the first signal is reduced to form the second signal and the amplitude of the third signal is amplified to form the fourth signal.

According to the disclosure, the first signal, the second signal, the third signal and the fourth signal respectively comprise a plurality of pulses.

According to the disclosure, the touch object is a stylus.

According to the disclosure, the light source module includes two light emitting diodes (LEDs) respectively disposed on two outer corners of the display panel.

According to the disclosure, an imaging processing method for detecting a moving direction of an object includes following steps. At least one reflective section is formed on a touch object. A light source module emits light to the touch object. The touch object moves from a first position at a first time to a second position at a second time. A first image sensor captures light reflected from the at least one reflective section so as to respectively generate a first signal at the first time and a second signal at the second time corresponding to the touch object. The second image sensor captures light reflected from the at least one reflective section so as to respectively generate a third signal at the first time and a fourth signal at the second time corresponding to the touch object. The control module computes a moving direction of the touch object from the first position to the second position according to variation of the first signal, the second signal, the third signal and the fourth signal.

According to the disclosure, the control module computing the moving direction of the touch object from the first position to the second position according to variation of the first signal, the second signal, the third signal and the fourth signal includes the control module determining the touch object to move from the first position to the second position in a first vertical direction, as a waveform of the first signal shifts in a first direction to form the second signal and a waveform of the third signal shifts in the first direction to form the fourth signal.

According to the disclosure, the control module computing the moving direction of the touch object from the first position to the second position according to variation of the first signal, the second signal, the third signal and the fourth signal includes the control module further determining the touch object to move from the first position to the second position in a second vertical direction opposite to the first vertical direction, as the waveform of the first signal shifts in a direction opposite to the first direction to form the second signal and the waveform of the third signal shifts in a direction opposite to the first direction to form the fourth signal.

According to the disclosure, the control module computing the moving direction of the touch object from the first position to the second position according to variation of the first signal, the second signal, the third signal and the fourth signal includes the control module determining the touch object to move from the first position to the second position in a first horizontal direction, as a waveform of the first signal slightly shifts in a first direction to form the second signal and a waveform of the third signal shifts in a direction opposite to the first direction to form the fourth signal.

According to the disclosure, the control module computing the moving direction of the touch object from the first position to the second position according to variation of the first signal, the second signal, the third signal and the fourth signal includes the control module further determining the touch object to move from the first position to the second position in a second horizontal direction opposite to the first horizontal direction, as the waveform of the first signal shifts in the direction opposite to the first direction to form the second signal and the waveform of the third signal slightly shifts in the first direction to form the fourth signal.

According to the disclosure, the control module computing the moving direction of the touch object from the first position to the second position according to variation of the first signal, the second signal, the third signal and the fourth signal includes the control module determining the touch object to rotate from the first position to the second position in a first rotating direction, as an amplitude of the first signal is amplified to form the second signal and an amplitude of the third signal is reduced to form the fourth signal.

According to the disclosure, the control module computing the moving direction of the touch object from the first position to the second position according to variation of the first signal, the second signal, the third signal and the fourth signal further includes the control module determining the touch object to rotate from the first position to the second position in a second rotating direction opposite to the first rotating direction, as the amplitude of the first signal is reduced to form the second signal and the amplitude of the third signal is amplified to form the fourth signal.

The present invention is to provide the optical imaging system and the imaging processing method capable of detecting the moving directions of the touch object. The image sensors respectively capture the light reflected from the touch object at different times to generate the corresponding signals, and the control module computes the moving directions of the touch object according to the variation of the signals, such as moving in the vertical and horizontal directions, or rotating clockwise and counterclockwise, so as to provide the host computer with a basis to perform the related touch operation. The light reflected from the touch object can be captured by the image sensors, so that the reflecting frame can be omitted so as to reduce difficulty in assembly and the manufacture cost. Furthermore, the moving directions of the touch object, such as a stylus, can be detected, so that the touch control by the touch object can replace the touch control by fingers, and the practical application of the touch object can be utilized widely and the accuracy of judging movement of the touch object can be enhanced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
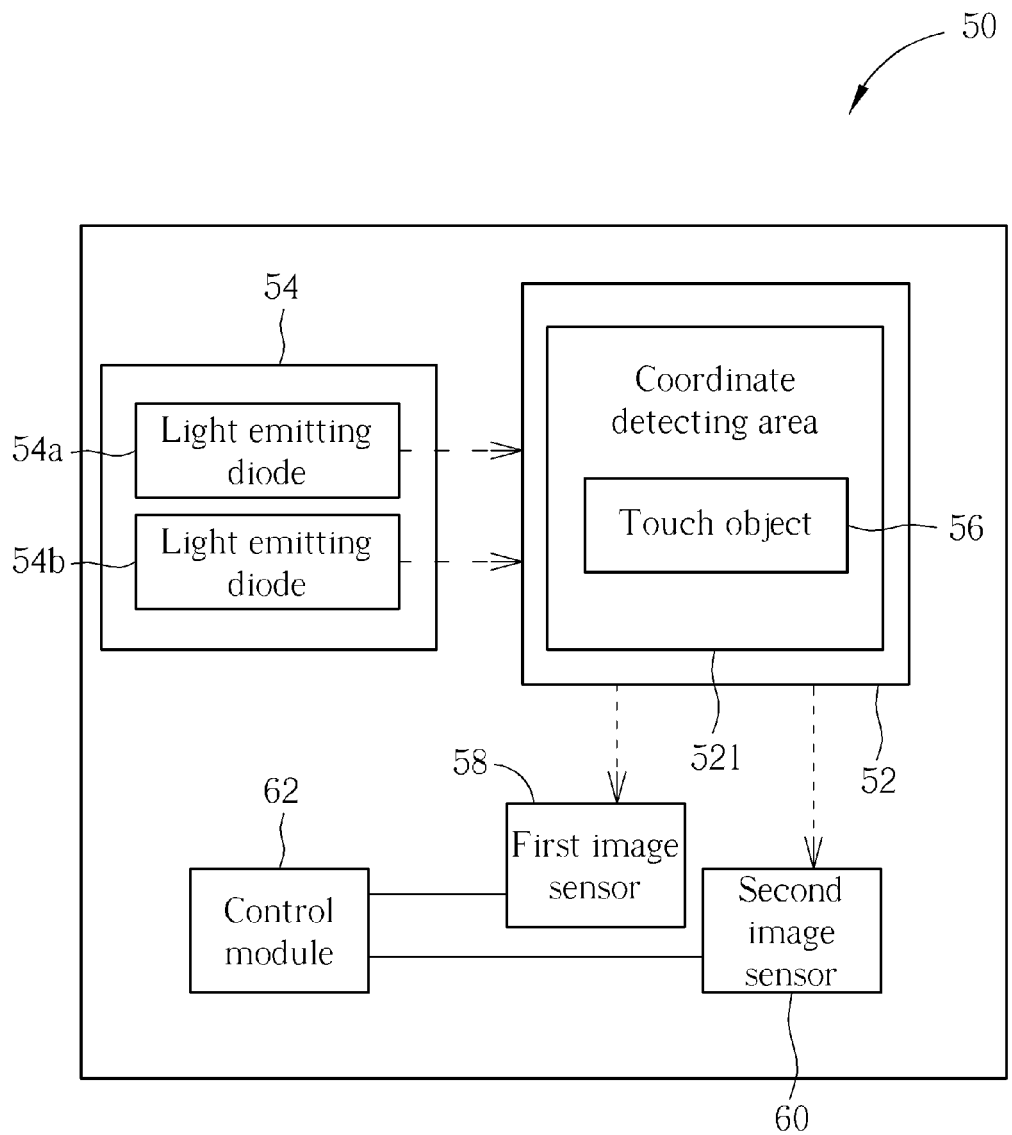
FIG. 1 is a functional block diagram of an optical imaging system according to an embodiment of the present invention.
Figure 2:
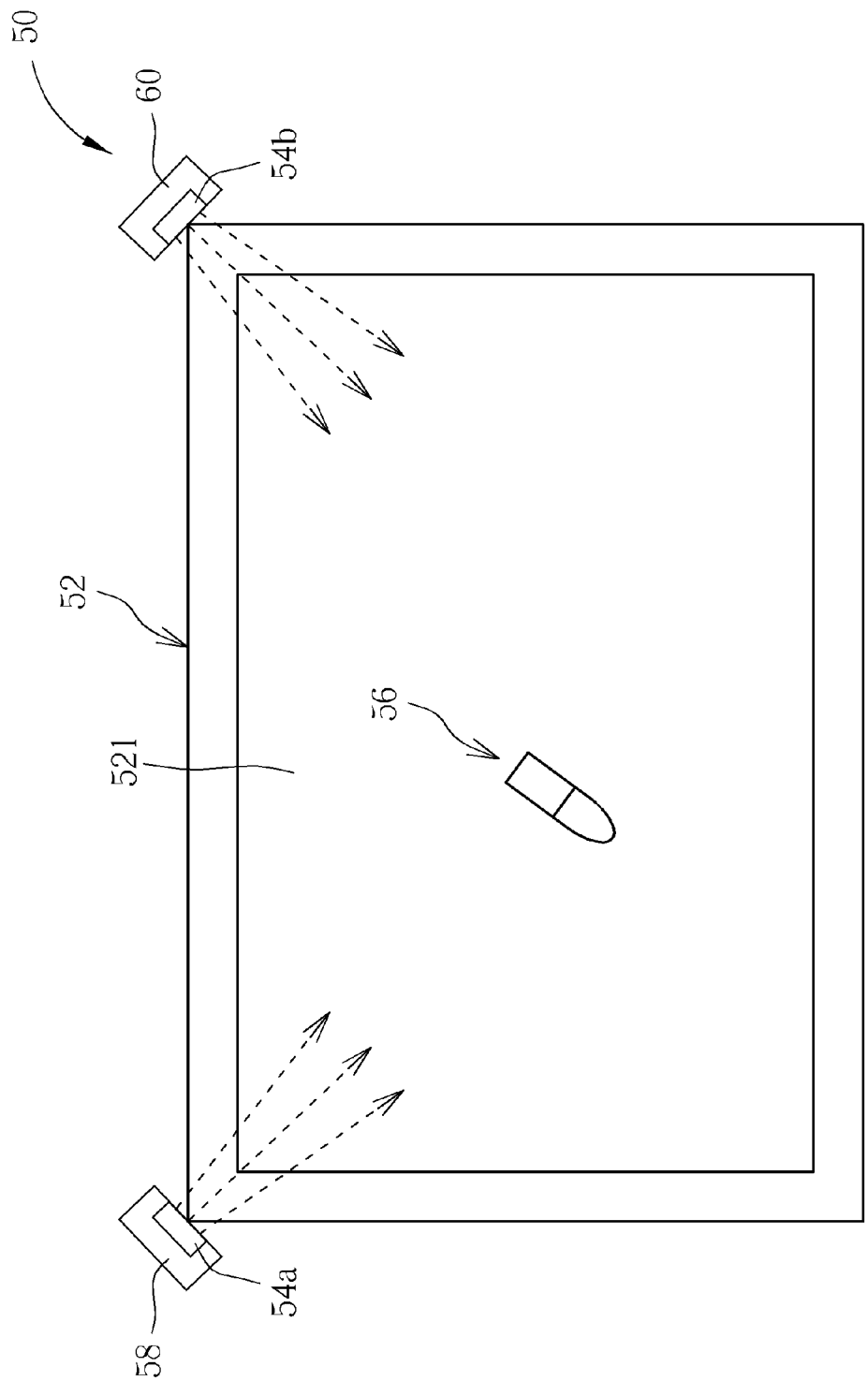
FIG. 2 is a front view of the optical imaging system according to the embodiment of the present invention.

Please refer to FIG. 1 and FIG. 2. FIG. 1 is a functional block diagram of an optical imaging system 50 according to an embodiment of the present invention. FIG. 2 is a front view of the optical imaging system 50 according to the embodiment of the present invention. The optical imaging system 50 is capable of detecting movement of an object, and the optical imaging system 50 includes a display panel 52, a light source module 54, a touch object 56, a first image sensor 58, a second image sensor 60 and a control module 62. The display panel 52 can be a touch panel, and a coordinate detecting area 521 is formed on the display panel 52. The light source module 54 is disposed on an outer side of the display panel 52 and for emitting light. In this embodiment, the light source module 54 can include two light emitting diodes (LEDs) 54a, 54b, such as laser LEDs or infrared LEDs, and the LEDs 54a, 54b are respectively disposed on two outer corners of the display panel 52. The LEDs 54a, 54b are for emitting light so as to illuminate the touch object 56. The first image sensor 58 and the second image sensor 60 are disposed on two outer corners of the display panel 52 adjacent to the LEDs 54a, 54b. The first image sensor 58 and the second image sensor 60 respectively capture light reflected from the touch object 56 so as to generate corresponding signals, and the first image sensor 58 and the second image sensor 60 can be cameras. The control module 62 is coupled to the first image sensor 58 and the second image sensor 60, and the control module 60 receives the image data captured from the first image sensor 58 and the second image sensor 60, so as to compute a coordinate value of the touch object on the coordinate detecting area 521. In addition, the display panel 52, the light source module 54, the first image sensor 58, the second image sensor 60 and the control module 62 can be integrated in a single display module, such as a monitor or an All in One PC. Alternatively, the display panel 52, the light source module 54, the first image sensor 58, the second image sensor 60 and the control module 62 can be modularized separately, such as being disposed inside a frame hung on the display panel 52, and the coordinate detecting area 521 can be a transparent panel disposed on the frame so as to be installed on the different display panels 52.

Figure 3:
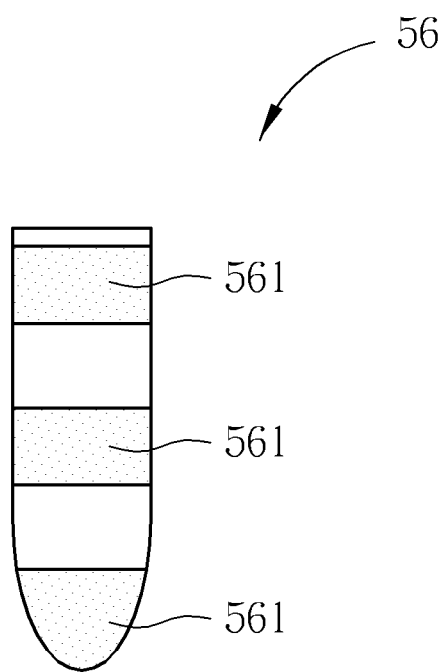
FIG. 3 is a diagram of a touch object according to the embodiment of the present invention.

Please refer to FIG. 3. FIG. 3 is a diagram of the touch object 56 according to the embodiment of the present invention. The touch object 56 can be a stylus, and the touch object 56 includes at least one reflective section 561. In this embodiment, the touch object 56 includes three reflective sections 561 disposed in intervals. Positions and numbers of the reflective sections 561 are not limited to this embodiment, and it depends on the practical requirements. The reflective sections 561 of the touch object 56 can be made of reflective material. For example, a plurality of transparent bead structures and a plurality of prism structures can be formed on the reflective section 561 of the touch object 56 for reflecting light emitted from the light source module 54, and the light can be reflected back along an original incident path.

Figure 4:
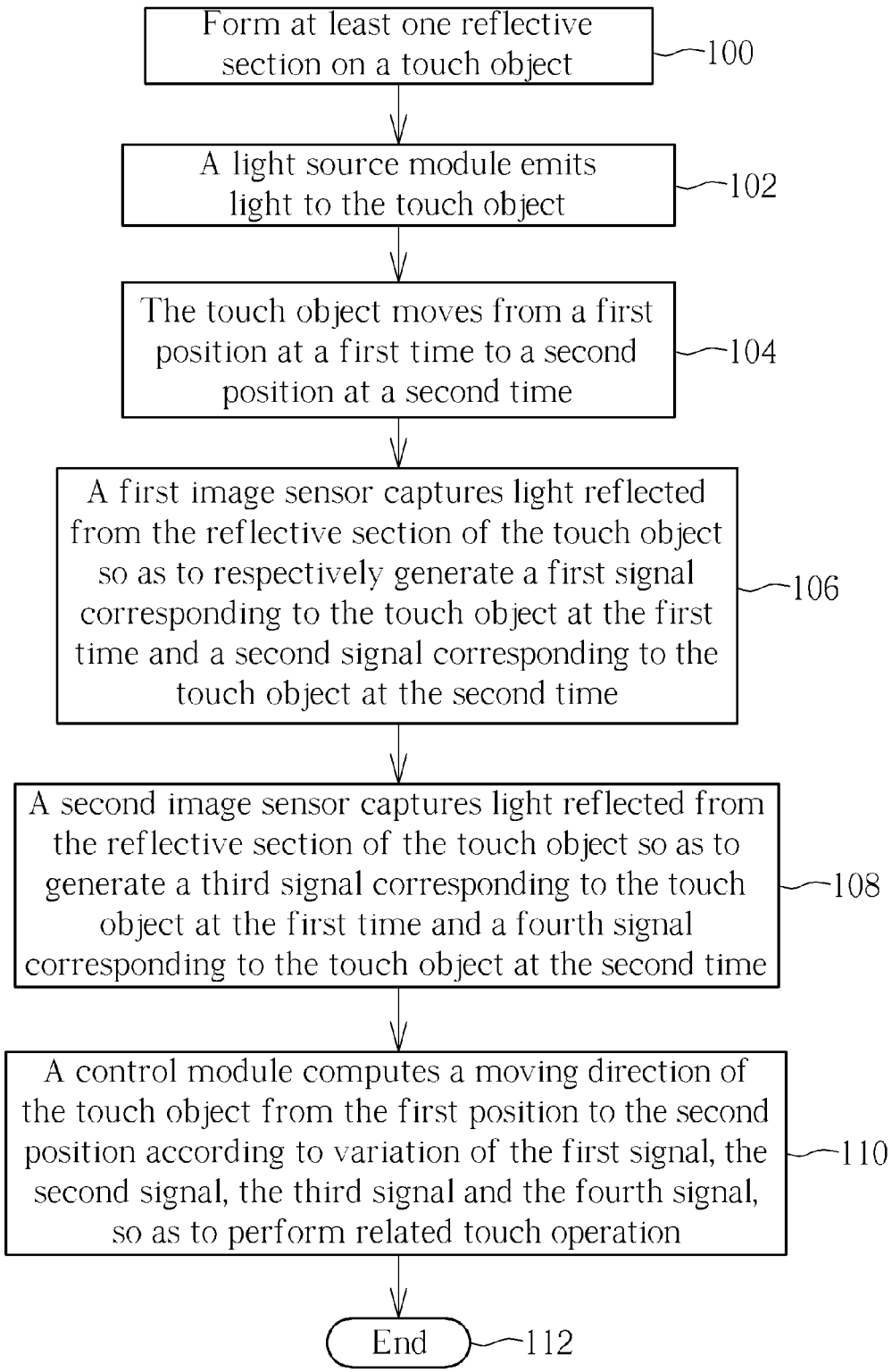
FIG. 4 is a flow chart of an imaging processing method for the optical imaging system according to the embodiment of the present invention.

Please refer to FIG. 4 to FIG. 16. FIG. 4 is a flow chart of an imaging processing method for the optical imaging system 50 according to the embodiment of the present invention. FIG. 5 to FIG. 16 are diagrams of the touch object 56 in different moving statuses and signal variation corresponding to the moving statuses according to the embodiment of the present invention. The imaging processing method includes following steps:

Step 100: Form the at least one reflective section 561 on the touch object 56.

Step 102: The light source module 54 emits light to the touch object 56 as the touch object 56 moves on the reflective section 561.

Step 104: The touch object 56 moves from a first position P1 at a first time T1 to a second position P2 at a second time T2.

Step 106: The first image sensor 58 captures light reflected from the reflective section 561 of the touch object 56, so as to respectively generate a first signal S1 corresponding to the touch object 56 at the first time T1 and a second signal S2 corresponding to the touch object 56 at the second time T2.

Step 108: The second image sensor 60 captures light reflected from the reflective section 561 of the touch object 56, so as to generate a third signal S3 corresponding to the touch object 56 at the first time T1 and a fourth signal S4 corresponding to the touch object 56 at the second time T2.

Step 110: The control module 62 computes a moving direction of the touch object 56 from the first position P1 to the second position P2 according to variation of the first signal S1, the second signal S2, the third signal S3 and the fourth signal S4, so as to perform related touch operation.

Step 112: End.

Detailed introduction of the above steps is described as follows. A user can move the touch object 56 on the coordinate detecting area 521. As the touch object 56 moves close to the coordinate detecting area 521, the light source module 54 emits the light to the touch object 56 so as to illuminate the touch object 56. Meanwhile, the first image sensor 58 and the second image sensor 60 can respectively capture the light reflected from the reflective section 561 of the touch object 56. The first signal S1, the second signal S2, the third signal S3 and the fourth signal S4 respectively includes a plurality of pulses. For example, three reflective sections 561 of the touch object 56 can be covered with transparent bead structures or prism structures, which are made of reflective material. The transparent bead structures or prism structures reflect almost all the light emitted from the LEDs 54a, 54b to the first image sensor 58 and the second image sensor 60 back along the original incident path, respectively, so that the first image sensor 58 and the second image sensor 60 respectively generate three pulses of signals.

Figure 5:
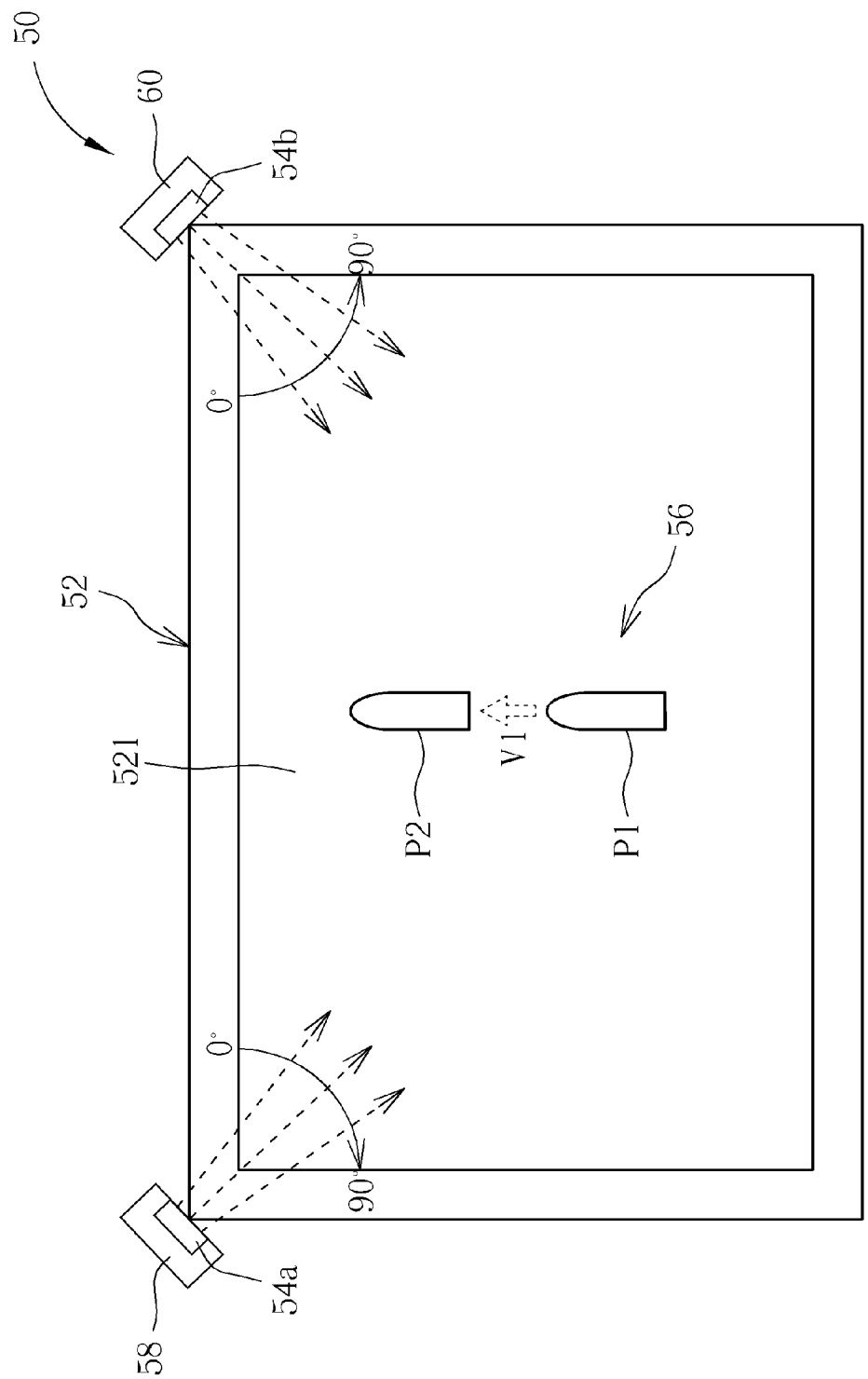
FIG. 5 to FIG. 16 are diagrams of the touch object in different moving statuses and signal variation corresponding to the moving statuses according to the embodiment of the present invention.
Figure 6:
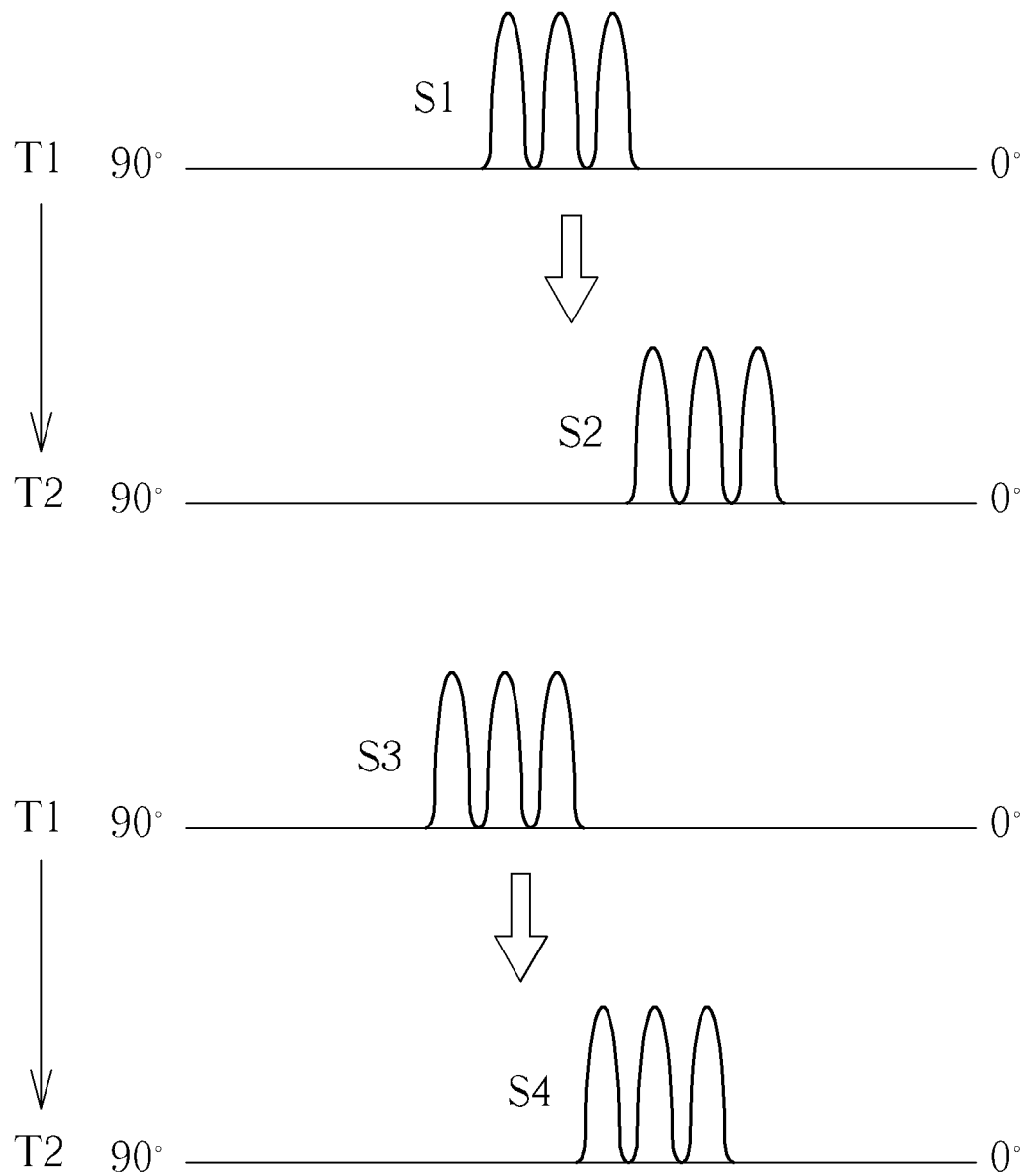

Please refer to FIG. 5 and FIG. 6. A sensing range (from 0-90 degrees in FIG. 5) of the first image sensor 58 and the second image sensor 60 is defined from a top side to a lateral side of the coordinate detecting area 521. When the touch object 56 moves from the first position P1 to the second position P2 in a first vertical direction V1, that is, the touch object 56 slides upward, a waveform of the first signal S1 generated by the first image sensor 58 shifts in a first direction (a right shift) to form the second signal S2, and a waveform of the third signal S3 generated by the second image sensor 60 shifts in the first direction (a right shift) to form the fourth signal S4. Comparing positions of the touch object 56 at different times, the touch object 56 is away from the first image sensor 58 and the second image sensor 60 at the first time T1, that is, the touch object 56 is at a position with a larger sensing angle (closer to 90 degrees) of the first image sensor 58 and the second image sensor 60. The touch object 56 is close to the first image sensor 58 and the second image sensor 60 at the second time T2, that is, the touch object 56 is at a position with a smaller sensing angle (closer to 0 degree) of the first image sensor 58 and the second image sensor 60. Hence, the initial signals, the first signal S1 and the third signal S3 shift in the same direction to respectively generate the final signals, the second signal S2 and the fourth signal S4. The touch object 56 is determined to move upward to approach the first image sensor 58 and the second image sensor 60 according to the variation of the waveform, that is, the movement of the touch object 56 is corresponding to an upward sliding touch control, so as to provide a host computer with a basis to perform the related touch operation.

Figure 7:
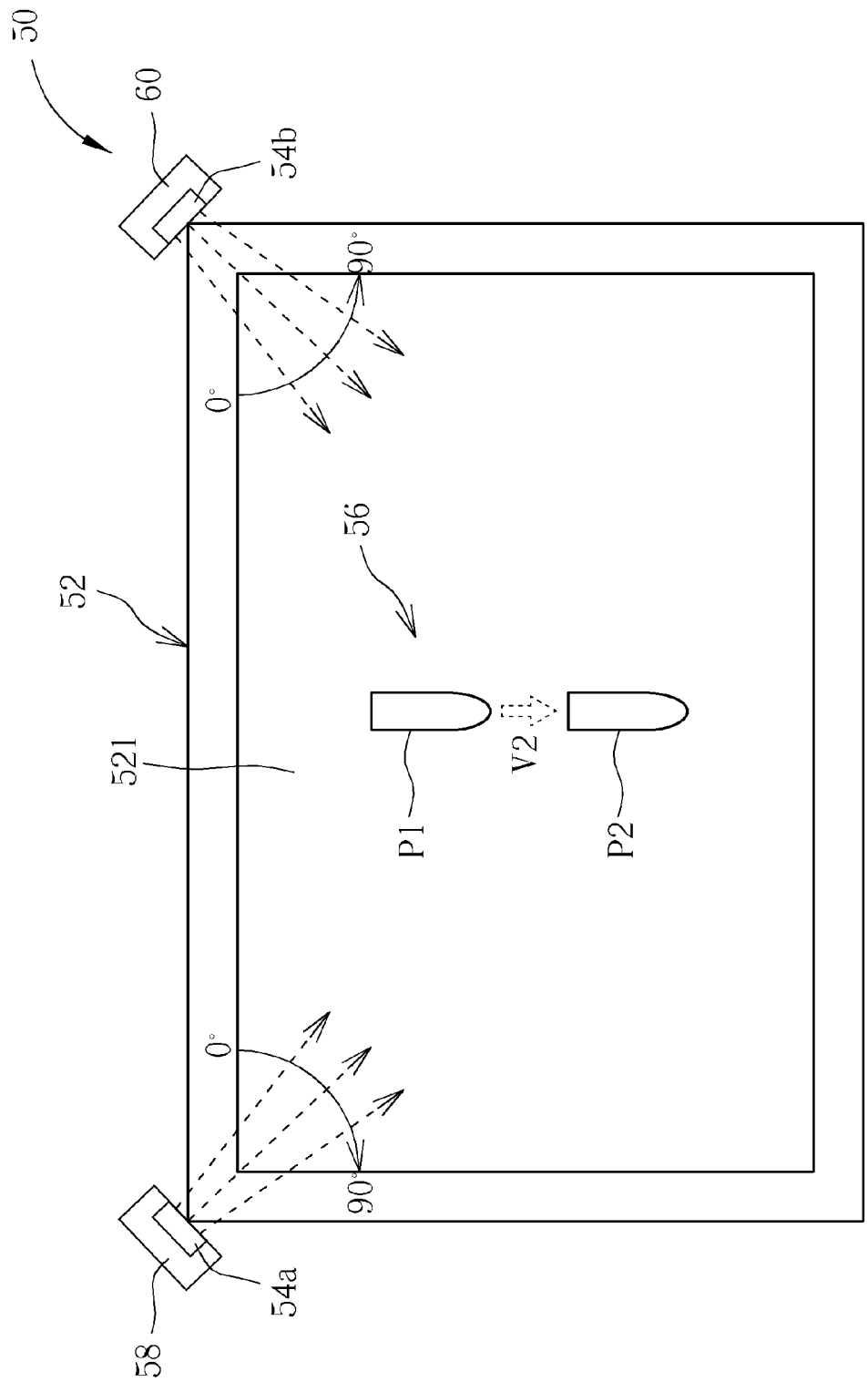
Figure 8:
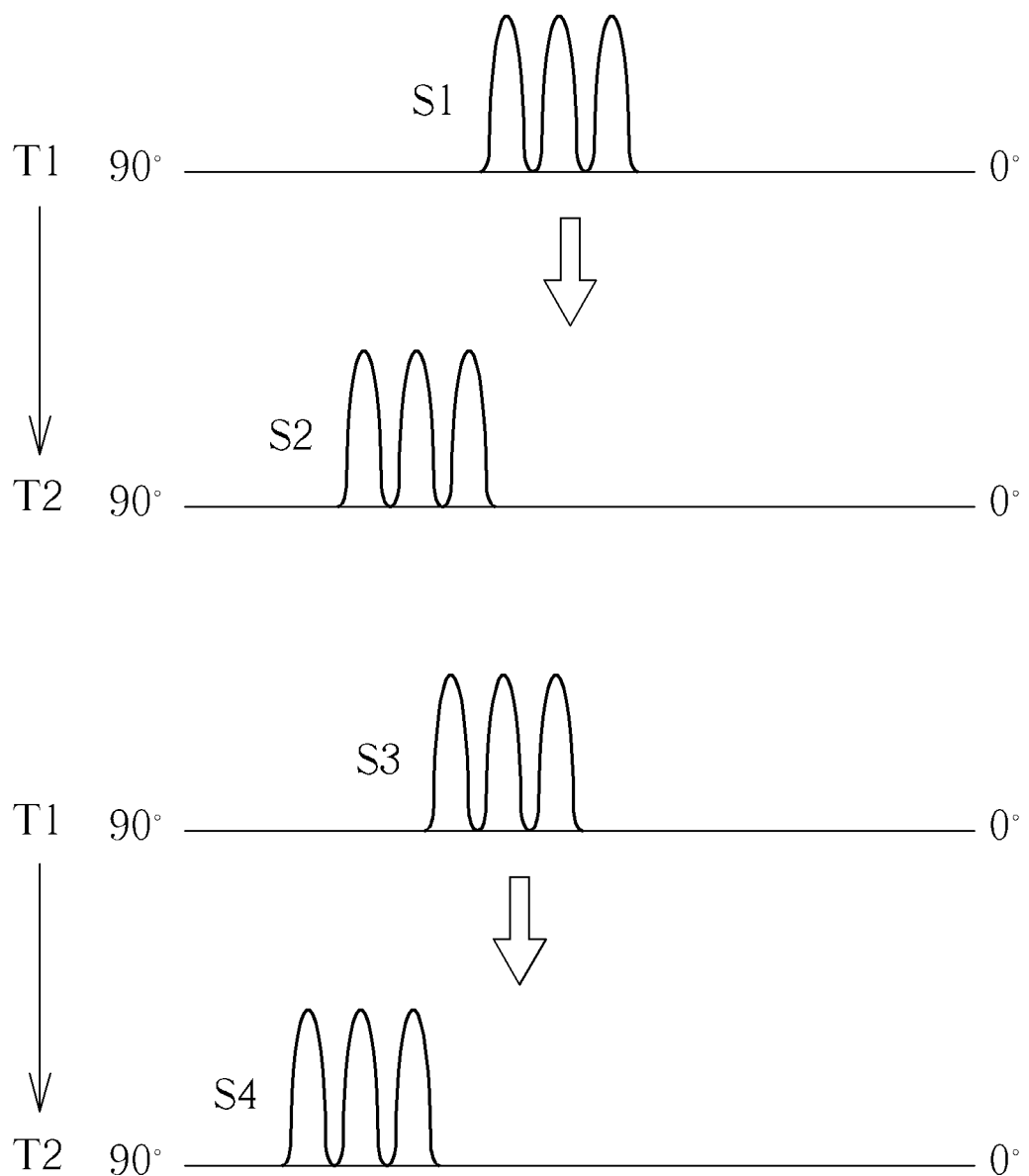

Please refer to FIG. 7 and FIG. 8. The sensing range (from 0-90 degrees in FIG. 7) of the first image sensor 58 and the second image sensor 60 is determined from the top side to the lateral side of the coordinate detecting area 521. When the touch object 56 moves from the first position P1 to the second position P2 in a second vertical direction V2, that is, the touch object 56 slides downward, the waveform of the first signal S1 generated by the first image sensor 58 shifts in a direction opposite to the first direction (a left shift) to form the second signal S2, and the waveform of the third signal S3 generated by the second image sensor 60 shifts in the direction opposite to the first direction (a left shift) to form the fourth signal S4. Comparing the positions of the touch object 56 at different times, the touch object 56 is near the first image sensor 58 and the second image sensor 60 at the first time T1, that is, the touch object 56 is at the position with a smaller sensing angle (closer to 0 degree) of the first image sensor 58 and the second image sensor 60. The touch object 56 is close to the first image sensor 58 and the second image sensor 60 at the second time T2, that is, the touch object 56 is at the position with a larger sensing angle (closer to 90 degrees) of the first image sensor 58 and the second image sensor 60. Hence, the initial signals, the first signal S1 and the third signal S3 shift in the same direction to respectively generate the final signals, the second signal S2 and the fourth signal S4. The touch object 56 is determined to move upward to approach the first image sensor 58 and the second image sensor 60 according to the variation of the waveform, that is, the movement of the touch object 56 is corresponding to a downward sliding touch control, so as to provide the host computer with a basis to perform the related touch operation.

Figure 9:
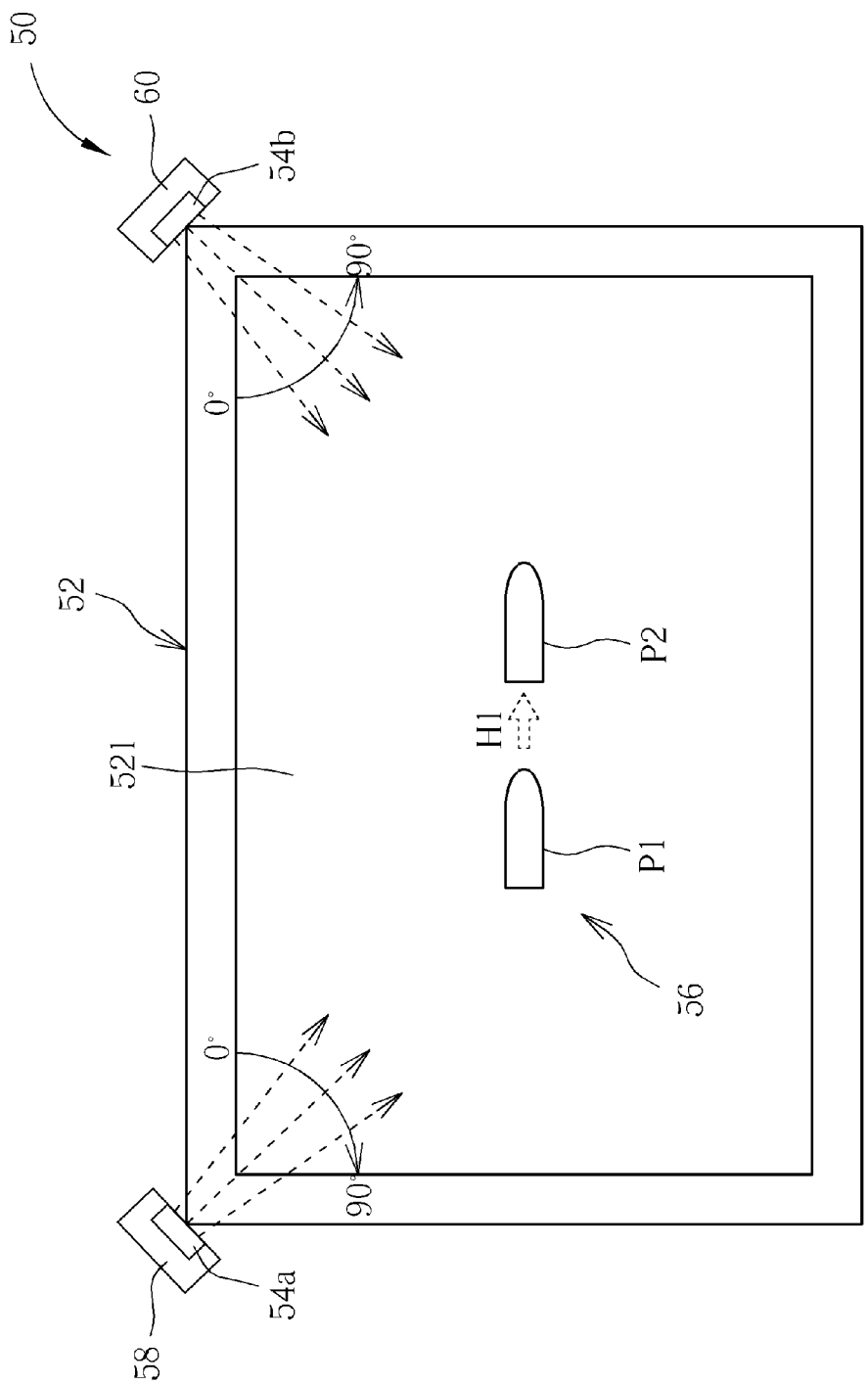
Figure 10:
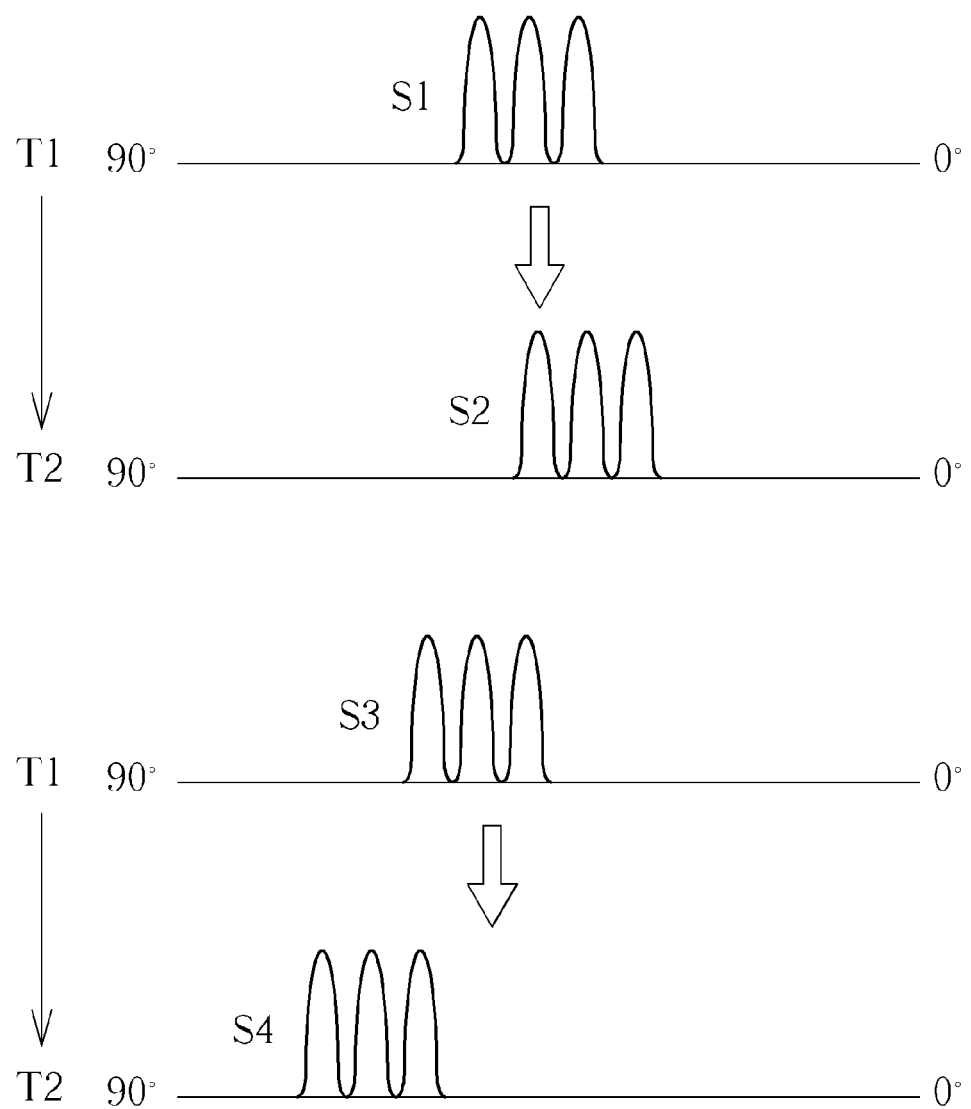

Please refer to FIG. 9 and FIG. 10. The sensing range (from 0-90 degrees in FIG. 9) of the first image sensor 58 and the second image sensor 60 is defined from the top side to the lateral side of the coordinate detecting area 521. When the touch object 56 moves from the first position P1 to the second position P2 in a first horizontal direction H1, that is, the touch object 56 slides rightward, the waveform of the first signal S1 generated by the first image sensor 58 slightly shifts in the first direction (a slight right shift) to form the second signal S2, and the waveform of the third signal S3 generated by the second image sensor 60 shifts in the direction opposite to the first direction (a left shift) to form the fourth signal S4. Comparing the positions of the touch object 56 at different times, the touch object 56 is near the first image sensor 58 and away from the second image sensor 60 at the first time T1, that is, the touch object 56 is at the position with a larger sensing angle (closer to 90 degrees) of the first image sensor 58 and with a smaller sensing angle (closer to 0 degree) of the second image sensor 60. On the other hand, the touch object 56 is away from the first image sensor 58 and near the second image sensor 60 at the second time T2, that is, the touch object 56 is at the position with a smaller sensing angle (closer to 0 degree) of the first image sensor 58 and with a larger sensing angle (closer to 90 degrees) of the second image sensor 60. Hence, the initial signals, the first signal S1 and the third signal S3 respectively shift in opposite directions to generate the final signals, the second signal S2 and the fourth signal S4. In addition, as the touch object 56 moves from the first position P1 to the second position P2 in the first horizontal direction H1, a variation of the sensing angle corresponding to the first image sensor 58 is small and a variation of the sensing angle corresponding to the second image sensor 60 is large, so that a shift of the waveform from the first signal S1 to the second signal S2 is smaller than a shift of the waveform from the third signal S3 to the fourth signal S4. The touch object 56 is determined to slide rightward away from the first image sensor to approach the second image sensor 60 according to the variation of the waveform, that is, the movement of the touch object 56 is corresponding to a rightward sliding touch control, so as to provide the host computer with a basis to perform the related touch operation.

Figure 11:
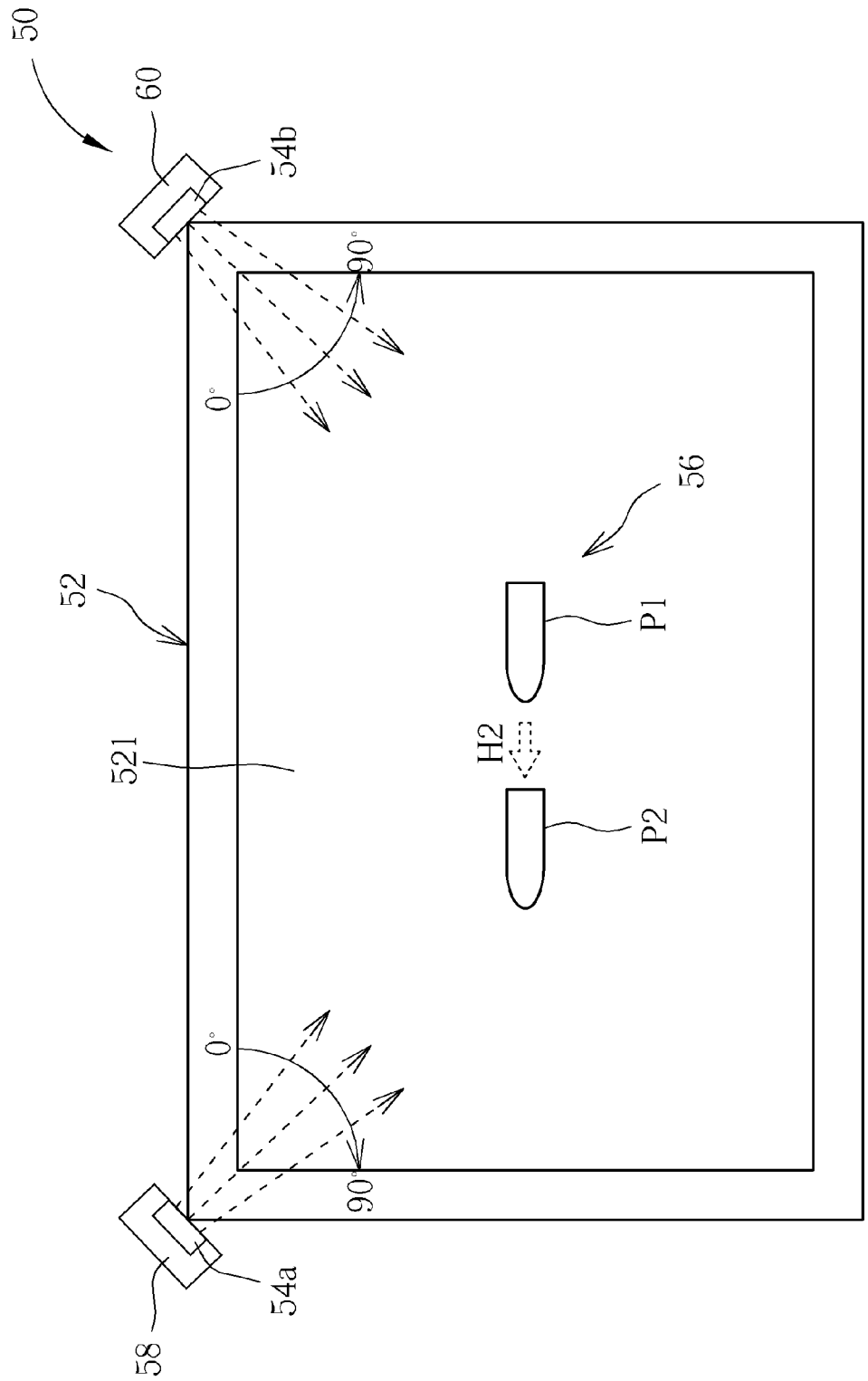
Figure 12:
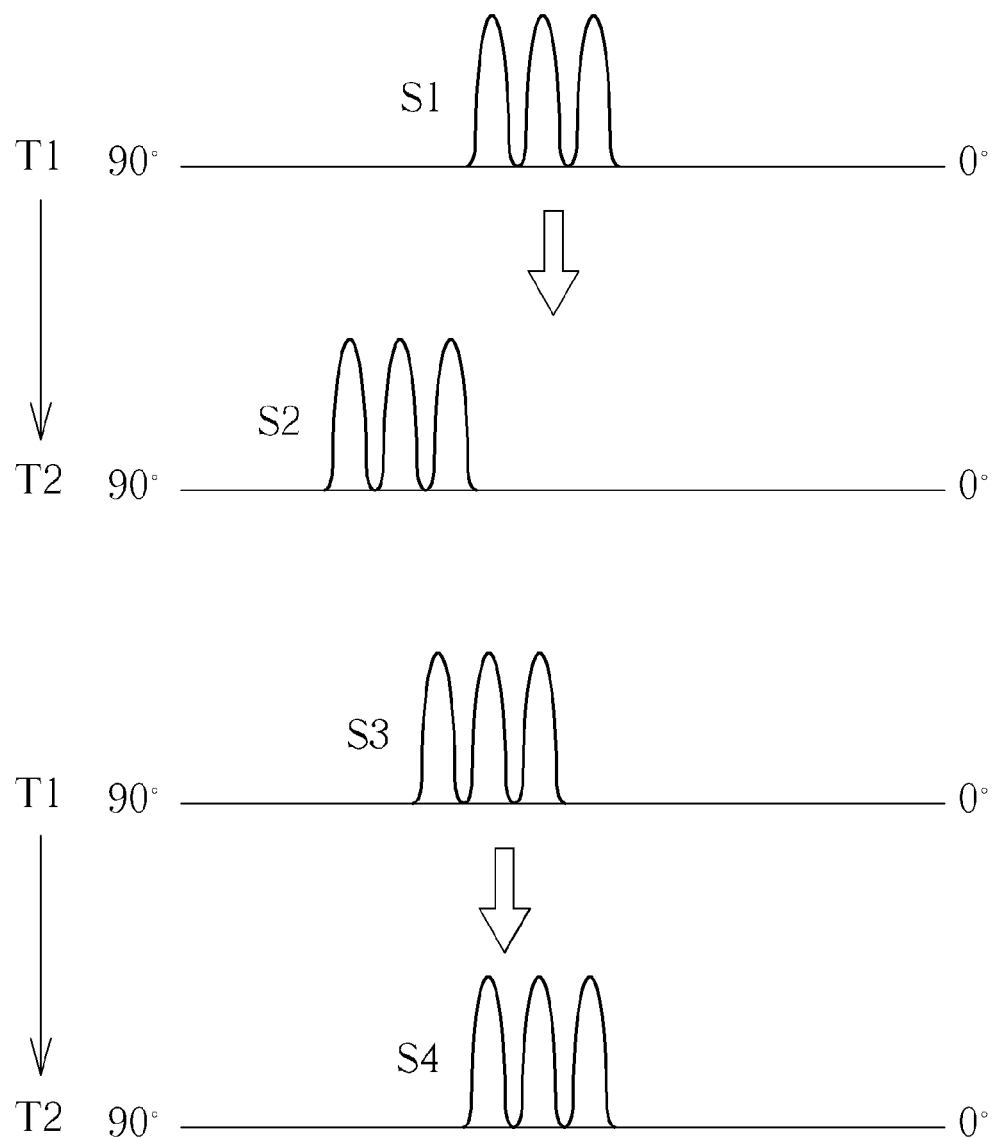

Please refer to FIG. 11 and FIG. 12. The sensing range (from 0-90 degrees in FIG. 11) of the first image sensor 58 and the second image sensor 60 is defined from the top side to the lateral side of the coordinate detecting area 521. When the touch object 56 moves from the first position P1 to the second position P2 in a second horizontal direction H2 opposite to the first horizontal direction H1, that is, the touch object 56 slides leftward, the waveform of the first signal S1 generated by the first image sensor 58 shifts in the direction opposite to the first direction (a left shift) to form the second signal S2, and the waveform of the third signal S3 generated by the second image sensor 60 slightly shifts in the first direction (a slight right shift) to form the fourth signal S4. Comparing the positions of the touch object 56 at different times, the touch object 56 is away from the first image sensor 58 and near the second image sensor 60 at the first time T1, that is, the touch object 56 is at the position with a smaller sensing angle (closer to 0 degree) of the first image sensor 58 and with a larger sensing angle (closer to 90 degrees) of the second image sensor 60. On the other hand, the touch object 56 is near the first image sensor 58 and away from the second image sensor 60 at the second time T2, that is, the touch object 56 is at the position with a larger sensing angle (closer to 90 degrees) of the first image sensor 58 and with a smaller sensing angle (closer to 0 degree) of the second image sensor 60. Hence, the initial signals, the first signal S1 and the third signal S3 respectively shift in opposite directions to generate the final signals, the second signal S2 and the fourth signal S4. In addition, as the touch object 56 moves from the first position P1 to the second position P2 in the second horizontal direction H2, a variation of the sensing angle corresponding to the first image sensor 58 is large and a variation of the sensing angle corresponding to the second image sensor 60 is small, so that a shift of the waveform from the first signal S1 to the second signal S2 is larger than a shift of the waveform from the third signal S3 to the fourth signal S4. The touch object 56 is determined to slide leftward to approach the first image sensor and to leave away from the second image sensor 60 according to the variation of the waveform, that is, the movement of the touch object 56 is corresponding to a leftward sliding touch control, so as to provide the host computer with a basis to perform the related touch operation.

Figure 13:
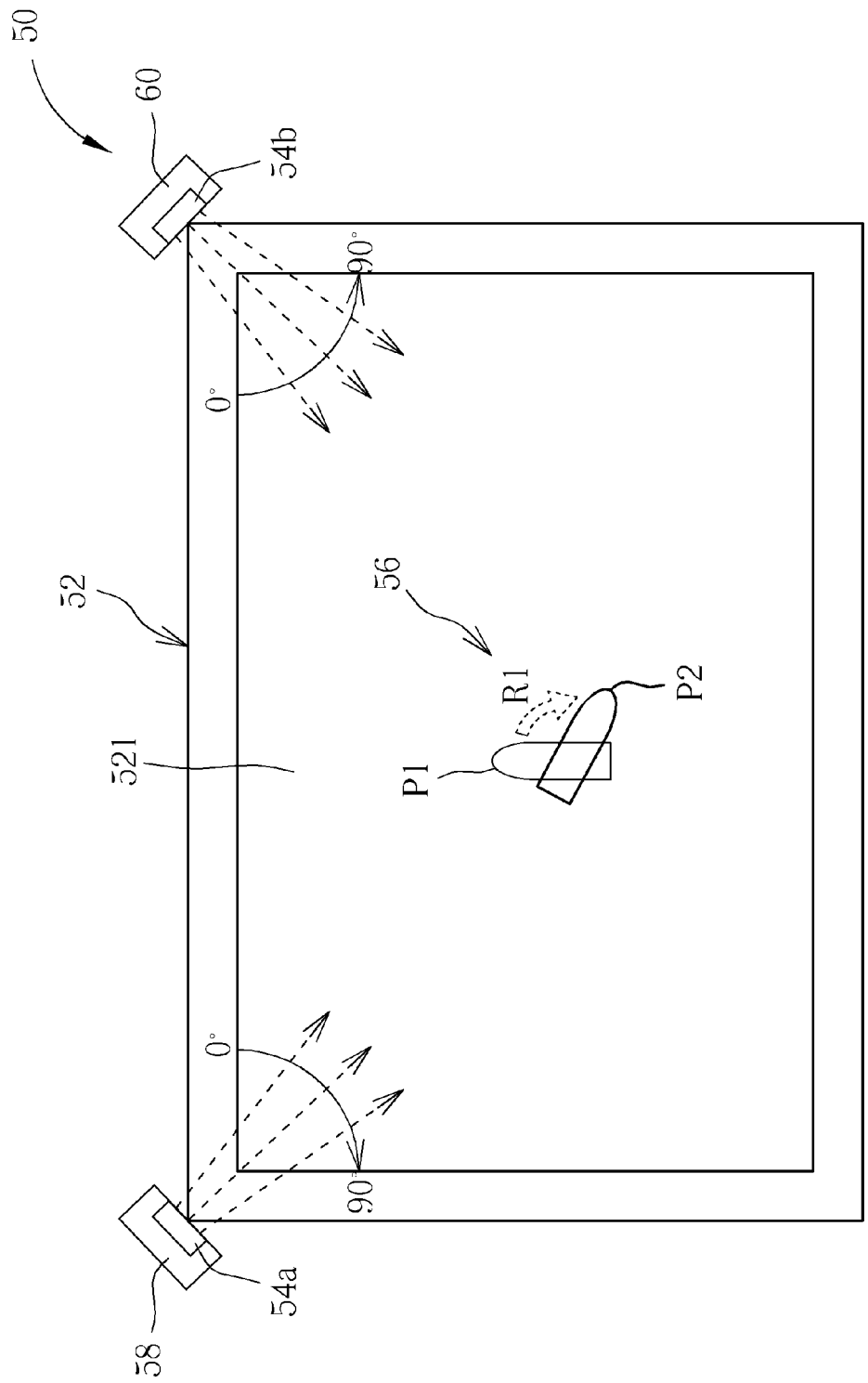
Figure 14:
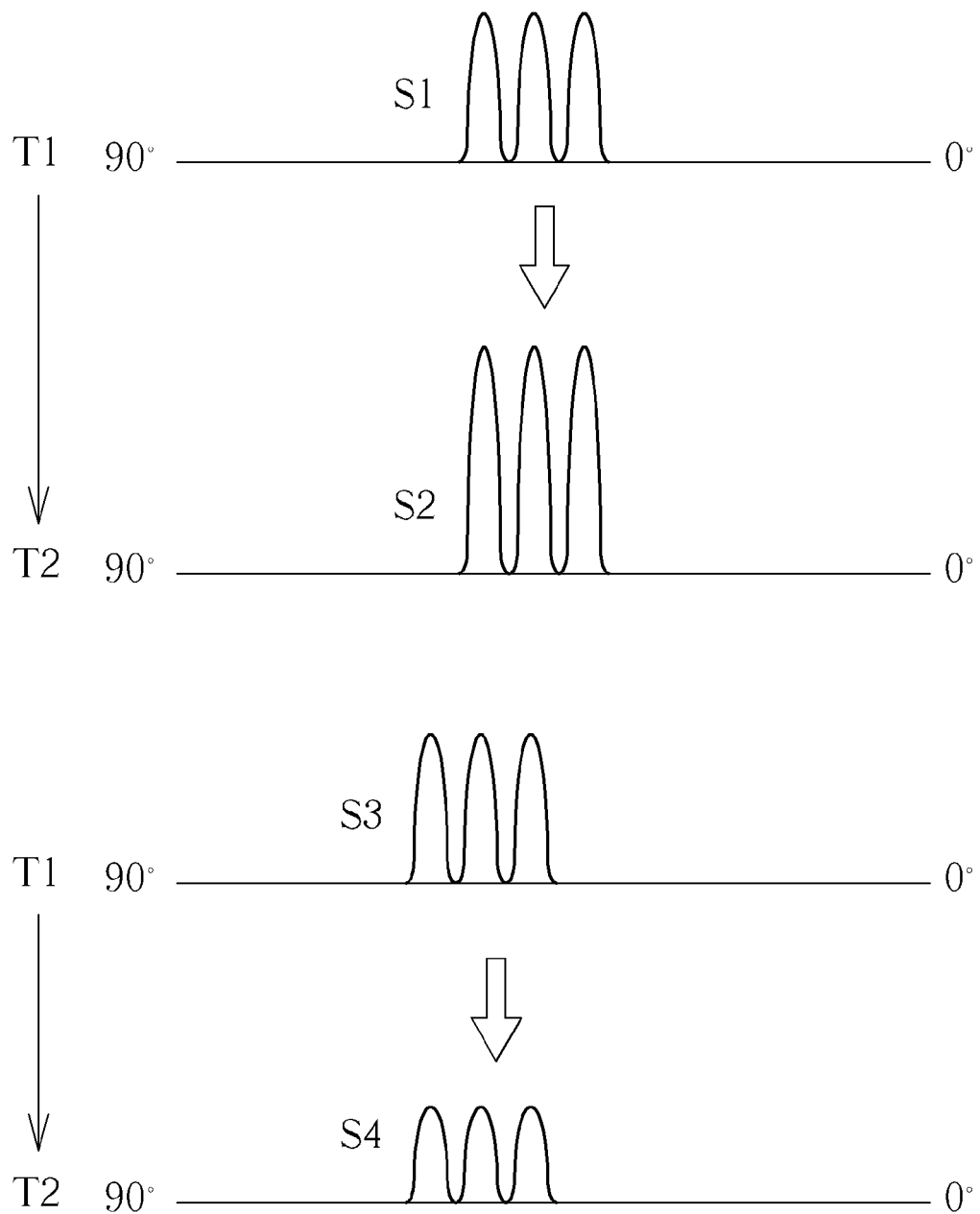

Please refer to FIG. 13 and FIG. 14. The sensing angle (from 0-90 degrees in FIG. 13) of the first image sensor 58 and the second image sensor 60 is defined from the top side to the lateral side of the coordinate detecting area 521. When the touch object 56 moves from the first position P1 to the second position P2 in a first rotating direction R1, that is, the touch object 56 rotates clockwise, an amplitude of the first signal S1 is amplified to form the second signal S2, and an amplitude of the third signal S3 is reduced to form the fourth signal S4. Comparing the positions of the touch object 56 at different times, the touch object 56 reflects more light to the first image sensor 58 and less light to the second image sensor 60 at the second time T2 than at the first time T1. A projecting area of the touch object 56 facing the first image sensor 58 at the second time T2 is larger than a projecting area of the touch object 56 facing the first image sensor 58 at the first time T1, so that the touch object 56 reflects more light to generate the second signal S2 with stronger intensity. On the other hand, a projecting area of the touch object 56 facing the second image sensor 60 at the second time T2 is smaller than a projecting area of the touch object 56 facing the second image sensor 60 at the first time T1, so that the touch object 56 reflects less light to generate the second signal S4 with weaker intensity. The touch object 56 is determined to rotate clockwise according to the variation of the waveform, that is, the movement of the touch object 56 is corresponding to a clockwise rotating touch control, so as to provide the host computer with a basis to perform the related touch operation.

Figure 15:
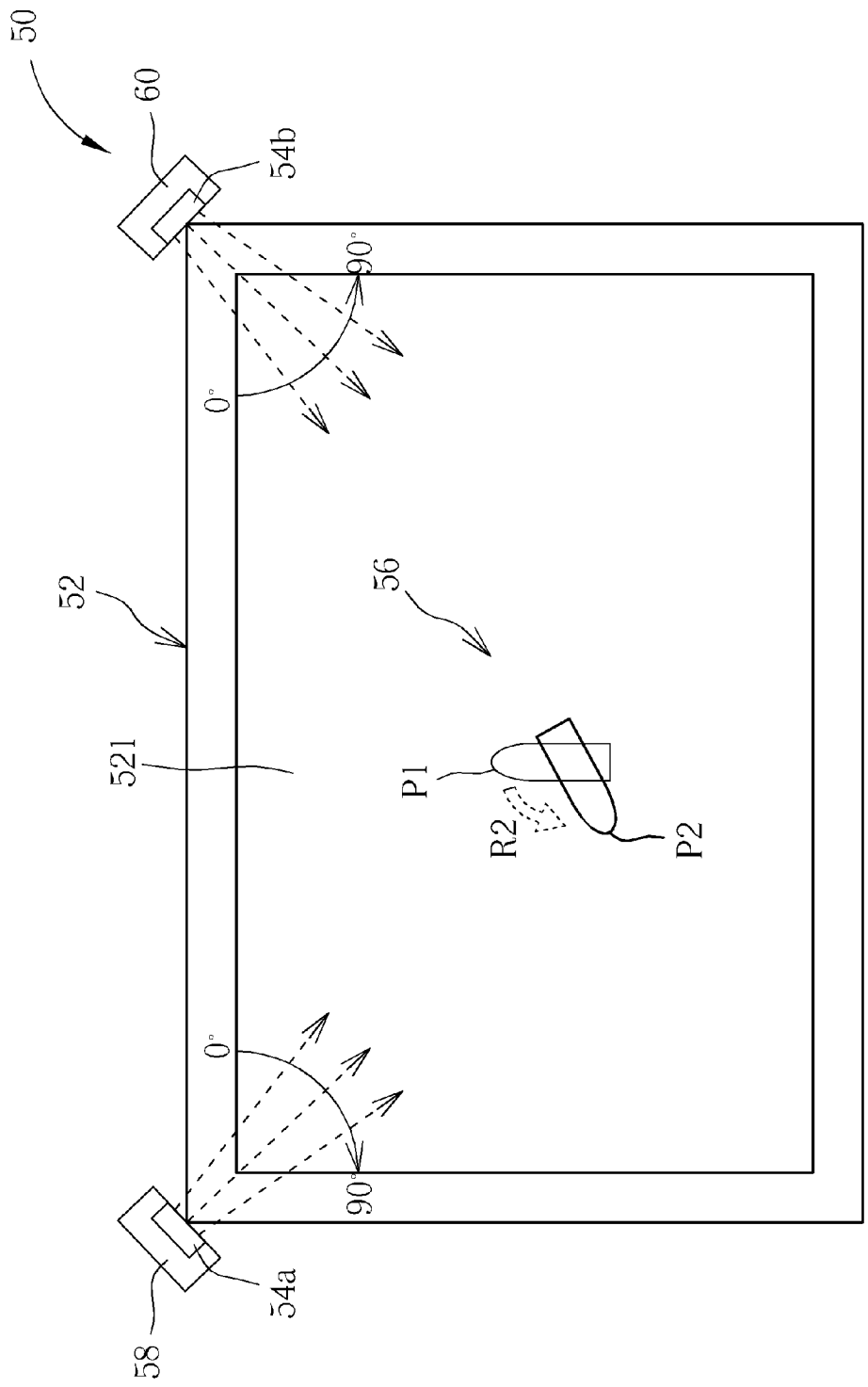
Figure 16:
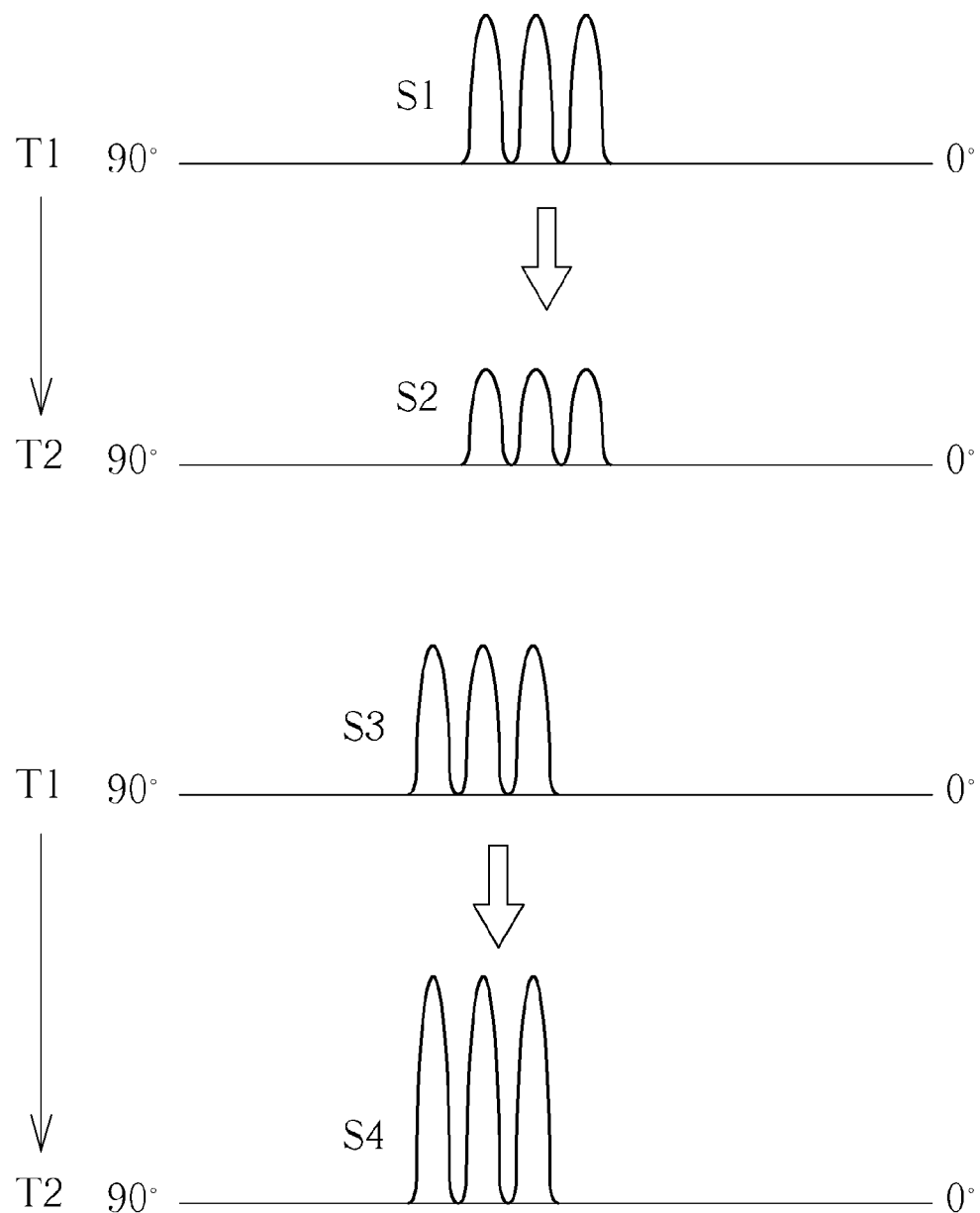

Please refer to FIG. 15 and FIG. 16. The sensing range (from 0-90 degrees in FIG. 15) of the first image sensor 58 and the second image sensor 60 is defined from the top side to the lateral side of the coordinate detecting area 521. When the touch object 56 moves from the first position P1 to the second position P2 in a second rotating direction R2 opposite to the first rotating direction R1, that is, the touch object 56 rotates counterclockwise, the amplitude of the first signal S1 is reduced to form the second signal S2, and the amplitude of the third signal S3 is amplified to form the fourth signal S4. Comparing the positions of the touch object 56 at different times, the touch object 56 reflects less light to the first image sensor 58 and more light to the second image sensor 60 at the second time T2 than at the first time T1. A projecting area of the touch object 56 facing the first image sensor 58 at the second time T2 is smaller than a projecting area of the touch object 56 facing the first image sensor 58 at the first time T1, so that the touch object 56 reflects less light to generate the second signal S2 with weaker intensity. On the other hand, a projecting area of the touch object 56 facing the second image sensor 60 at the second time T2 is larger than a projecting area of the touch object 56 facing the second image sensor 60 at the first time T1, so that the touch object 56 reflects more light to generate the second signal S4 with stronger intensity. The touch object 56 is determined to rotate counterclockwise according to the variation of the waveform, that is, the movement of the touch object 56 is corresponding to a counterclockwise rotating touch control, so as to provide the host computer with a basis to perform the related touch operation.

In contrast to the prior art, the present invention is to provide the optical imaging system and the imaging processing method capable of detecting the moving directions of the touch object. The image sensors respectively capture the light reflected from the touch object at different times to generate the corresponding signals, and the control module computes the moving directions of the touch object according to the variation of the signals, such as moving in the vertical and horizontal directions, or rotating clockwise and counterclockwise, so as to provide the host computer with a basis to perform the related touch operation. The light reflected from the touch object can be captured by the image sensors, so that the reflecting frame can be omitted so as to reduce difficulty in assembly and the manufacture cost. Furthermore, the moving directions of the touch object, such as a stylus, can be detected, so that the touch control by the touch object can replace the touch control by fingers, and the practical application of the touch object can be utilized widely and the accuracy of judging movement of the touch object can be enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging system capable of detecting a moving direction of an object, and the optical imaging system comprising:
    a display panel, whereon a coordinate detecting area is formed;
    a light source module disposed on an outer side of the display panel and for emitting light;
    a touch object comprising at least one reflective section for reflecting the light emitted from the light source module as moving in the coordinate detecting area, and the touch objects moving from a first position at a first time to a second position at a second time;
    a first image sensor disposed on an outer corner of the display panel and for capturing light reflected from the at least one reflective section so as to respectively generate a first signal at the first time and a second signal at the second time corresponding to the touch object;
    a second image sensor disposed on another outer corner of the display module and for capturing light reflected from the at least one reflective section so as to respectively generate a third signal at the first time and a fourth signal at the second time corresponding to the touch object; and
    a control module coupled to the first image sensor and the second image sensor, and the control module being for computing a moving direction of the touch object from the first position to the second position according to variation of the first signal, the second signal, the third signal and the fourth signal.

2. The optical imaging system of claim 1, wherein a plurality of transparent bead structures or a plurality of prism structures is formed on the touch object.

3. The optical imaging system of claim 1, wherein the control module determines the touch object to move from the first position to the second position in a first vertical direction, as a waveform of the first signal shifts in a first direction to form the second signal and a waveform of the third signal shifts in the first direction to form the fourth signal.

4. The optical imaging system of claim 3, wherein the control module further determines the touch object to move from the first position to the second position at a second vertical direction opposite to the first vertical direction, as the waveform of the first signal shifts in a direction opposite to the first direction to form the second signal and the waveform of the third signal shifts in the direction opposite to the first direction to form the fourth signal.

5. The optical imaging system of claim 1, wherein the control module determines the touch object to move from the first position to the second position in a first horizontal direction, as a waveform of the first signal slightly shifts in a first direction to form the second signal and a waveform of the third signal shifts in a direction opposite to the first direction to form the fourth signal.

6. The optical imaging system of claim 5, wherein the control module further determines the touch object to move from the first position to the second position in a second horizontal direction opposite to the first horizontal direction, as the waveform of the first signal shifts in the direction opposite to the first direction to form the second signal and the waveform of the third signal slightly shifts in the first direction to form the fourth signal.

7. The optical imaging system of claim 1, wherein the control module determines the touch object to rotate from the first position to the second position in a first rotating direction, as an amplitude of the first signal is amplified to form the second signal and an amplitude of the third signal is reduced to form the fourth signal.

8. The optical imaging system of claim 7, wherein the control module further determines the touch object to rotate from the first position to the second position in a second rotating direction opposite to the first rotating direction, as the amplitude of the first signal is reduced to form the second signal and the amplitude of the third signal is amplified to form the fourth signal.

9. The optical imaging system of claim 1, wherein the first signal, the second signal, the third signal and the fourth signal respectively comprise a plurality of pulses.

10. The optical imaging system of claim 1, wherein the touch object is a stylus.

11. The optical imaging system of claim 1, wherein the light source module comprises two light emitting diodes (LEDs) respectively disposed on two outer corners of the display panel.

12. An imaging processing method for detecting a moving direction of an object, comprising:
    forming at least one reflective section on a touch object;
    a light source module emitting light to the touch object;
    the touch object moving from a first position at a first time to a second position at a second time;
    a first image sensor capturing light reflected from the at least one reflective section so as to respectively generate a first signal at the first time and a second signal at the second time corresponding to the touch object;
    a second image sensor capturing light reflected from the at least one reflective section so as to respectively generate a third signal at the first time and a fourth signal at the second time corresponding to the touch object; and
    a control module computing a moving direction of the touch object from the first position to the second position according to variation of the first signal, the second signal, the third signal and the fourth signal.

13. The optical imaging method of claim 12, wherein the control module computing the moving direction of the touch object from the first position to the second position according to variation of the first signal, the second signal, the third signal and the fourth signal comprises:
    the control module determining the touch object to move from the first position to the second position in a first vertical direction, as a waveform of the first signal shifts in a first direction to form the second signal and a waveform of the third signal shifts in the first direction to form the fourth signal.

14. The optical imaging system of claim 13, wherein the control module computing the moving direction of the touch object from the first position to the second position according to variation of the first signal, the second signal, the third signal and the fourth signal comprises:
    the control module further determining the touch object to move from the first position to the second position in a second vertical direction opposite to the first vertical direction, as the waveform of the first signal shifts in a direction opposite to the first direction to form the second signal and the waveform of the third signal shifts in a direction opposite to the first direction to form the fourth signal.

15. The optical imaging system of claim 12, wherein the control module computing the moving direction of the touch object from the first position to the second position according to variation of the first signal, the second signal, the third signal and the fourth signal comprises:
    the control module determining the touch object to move from the first position to the second position in a first horizontal direction, as a waveform of the first signal slightly shifts in a first direction to form the second signal and a waveform of the third signal shifts in a direction opposite to the first direction to form the fourth signal.

16. The optical imaging system of claim 15, wherein the control module computing the moving direction of the touch object from the first position to the second position according to variation of the first signal, the second signal, the third signal and the fourth signal comprises:
    the control module further determining the touch object to move from the first position to the second position in a second horizontal direction opposite to the first horizontal direction, as the waveform of the first signal shifts in the direction opposite to the first direction to form the second signal and the waveform of the third signal slightly shifts in the first direction to form the fourth signal.

17. The optical imaging system of claim 12, wherein the control module computing the moving direction of the touch object from the first position to the second position according to variation of the first signal, the second signal, the third signal and the fourth signal comprises:
    the control module determining the touch object to rotate from the first position to the second position in a first rotating direction, as an amplitude of the first signal is amplified to form the second signal and an amplitude of the third signal is reduced to form the fourth signal.

18. The optical imaging system of claim 17, wherein the control module computing the moving direction of the touch object from the first position to the second position according to variation of the first signal, the second signal, the third signal and the fourth signal comprises:
    the control module further determining the touch object to rotate from the first position to the second position in a second rotating direction opposite to the first rotating direction, as the amplitude of the first signal is reduced to form the second signal and the amplitude of the third signal is amplified to form the fourth signal.

* * * * *